Aug. 3, 1948.　　　　　L. B. MILLER　　　　　2,446,512
HAND CULTIVATING AND WEEDING TOOL
Filed July 21, 1945
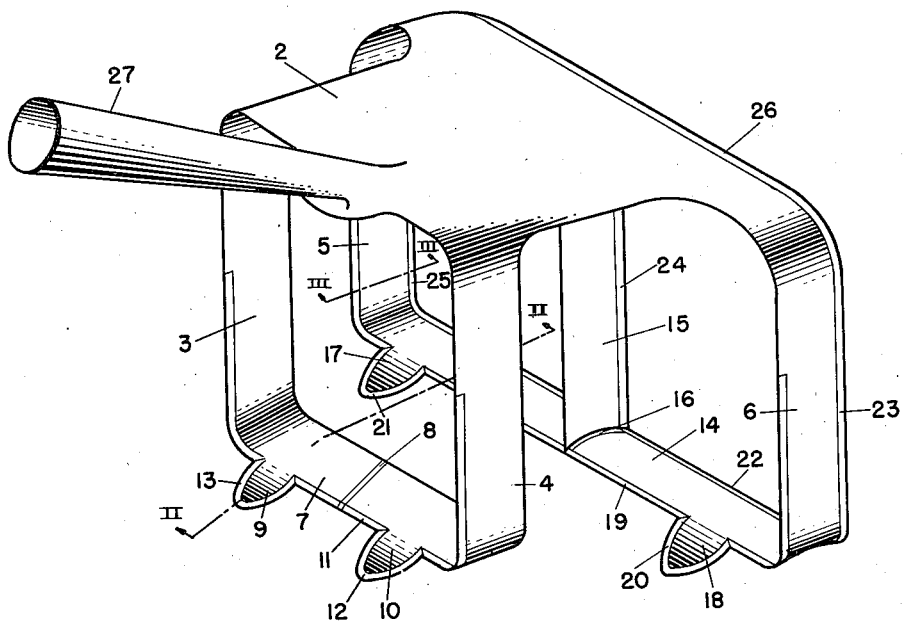
FIG. 1
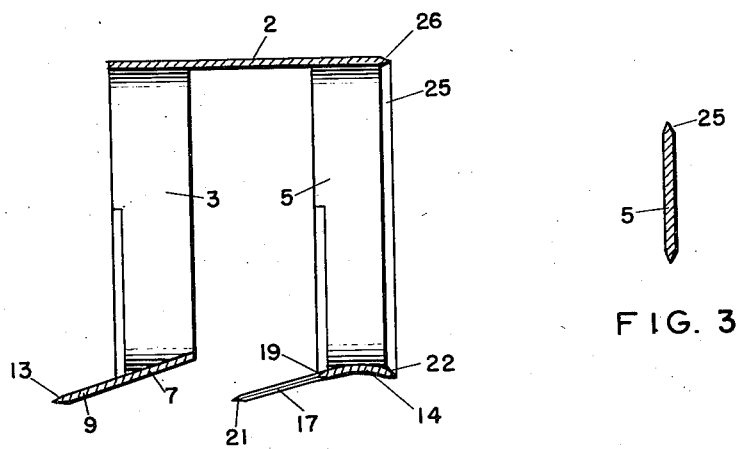
FIG. 2
FIG. 3
INVENTOR.
Levi B. Miller
by Harold A. Borthwick
ATTORNEY Patented Aug. 3, 1948

2,446,512

UNITED STATES PATENT OFFICE 2,446,512

HAND CULTIVATING AND WEEDING TOOL

Levi B. Miller, Lancaster Township, Lancaster County, Pa.

Application July 21, 1945, Serial No. 606,376

5 Claims. (Cl. 97—61)

My invention relates to cultivators. More particularly, it is concerned with cultivators of the type which are manually operated, although the invention is not so restricted.

The ordinary hoe which has its blade in a generally vertical position is well adapted for soil transfer, and if held in a substantially horizontal position will effectively cut off weeds below the upper surface of the soil. The hoe, however, does not fine the soil or break up the upper crust. Additionally, it is effective only with a pulling motion and must be lifted and replaced in the soil at each stroke. There are many so-called scuffle hoes on the market, and they are best adapted for cutting weeds below the surface and may be operated in either a pushing or pulling motion, but all these hoes are without provision for depth control, or are ineffective for cutting to any substantial depth below the surface. Additionally, they do not fine the soil to any extent below the surface and they do not even effectively break up the surface crust. There are also shovel harrow type cultivators having a number of prongs, broadened at the bottom, and while these are very effective for fining the soil and for loosening weeds, they are not effective, however, for cutting off weeds or for uprooting those weeds which may be disposed between the teeth. As a consequence, if the soil is wet or becomes wet shortly after cultivation, the weeds have a tendency to reestablish themselves and are not destroyed. Cutting off the tops of the weeds from the roots is decidedly preferred to bodily tearing out the whole weed and permitting it to rest on the ground where root growth may be reestablished.

The principal object of my invention is to provide a cultivator which is capable of performing a great variety of tasks with good control and effectiveness, while being easy and convenient to operate. For example, by my invention there is combined in a single instrument elements which will perform the functions of a scuffle hoe, a shovel harrow type cultivator, and a flat bladed garden hoe; thus, the same tool may be used for the soil fining of a shovel harrow type cultivator, the weed cutting of a scuffle hoe, or the soil transference generally accomplished by use of a hoe, as in "hilling-up" plants or garden rows. Also, a combination of these functions may be obtained simultaneously.

Another object is to provide a cultivator effective for below the surface fining, which is provided with means to control the depth of cut or "bite" taken by the cultivator. In weed removal between plant rows, for example, it is desirable to cut off the weeds some distance below the surface of the soil, but it is essential to control the depth of cut to avoid damage to plant roots which may spread out below the surface into the space between rows. It is also desirable to simultaneously obtain a fining action on the soil between the rows to a substantial depth to provide a dust mulch and also to permit rapid penetration of moisture from the surface to the plant roots and for aeration.

Another object is to provide a cultivator which will be operative with either a pulling or a pushing motion to perform the functions of weed cutting and soil fining. This makes possible the use of the tool as a scuffle hoe with the added advantage that fining may be simultaneously accomplished and combined with the usual functions of a scuffle hoe.

Other objects of my invention will become apparent upon consideration of the detailed description of the invention which follows.

In order that my invention may be more readily understood, I shall describe the same in conjunction with the attached drawing, in which:

Figure 1 is a perspective view of the device;

Figure 2 is a sectional view taken on the line II—II of Figure 1, illustrating the relative inclination of the cutting blades and teeth; and Figure 3 is a sectional view taken on the line III—III of Figure 1, illustrating the sharpened edges of one of the rear blades of the cultivator.

The cultivator may be formed from a sheet metal stamping and may be suitably joined by welding, brazing, riveting, or otherwise. It consists of a horizontal top supporting member 2 from which extend vertical blades 3 and 4 disposed at the forward portion of the cultivator, and corresponding vertical blades 5 and 6 disposed at the rear portion thereof. The blades 3 and 4 are connected by an inclined blade 7 which is generally in a plane normal to the blades 3 and 4. The blade 7 is preferably integral with the blades 3 and 4, being formed from inwardly bent portions of each, joined together at the center by welding as indicated at 8 in Figure 1. The horizontal blade 7 is inclined forwardly and downwardly as indicated in Figure 2 to provide for below the surface cultivation as will be more fully hereinafter described. The angle of inclination is not critical but for best results I have found that the blade should extend forwardly and downwardly at an angle between about 15 degrees and 25 degrees with respect to a line drawn parallel to the top supporting member 2. In the embodiment illustrated, the blades 3, 4, and 7 constitute with the top 2 a closed frame which is of generally square outline. Teeth may be provided on the blade 7, and these preferably are inclined at the same angle as the blade 7, although they may have a somewhat greater or lesser angle if desired. While two teeth 9 and 10 have been shown in the drawing, the number of teeth may be varied or they may be entirely eliminated, if desired. The teeth are to assist in soil fining and I prefer to incorporate them. The leading edge 11 of the blade 7 and the edges 12 and 13 of the teeth 9 and 10 are preferably sharpened so as to make easy the severance of weeds and the breaking up of surface crusts.

The rear vertical blades 5 and 6 are formed in the same manner as the forward blades 3 and 4 and as indicated in Figure 1 are joined together to provide a horizontal blade 14 complementary to the forward horizontal blade 7. A supplemental fining blade 15 which is vertically disposed with respect to the blade 14 may be connected between the upper supporting element 2 and the blade 14 by welding as indicated at 16 in Figure 1. This welded joint 16 may also serve to secure the portions which constitute the blade 14 and will form a structurally strong and rigid unit. The upper portion of the blade 15 may be welded, riveted, or otherwise secured to the upper supporting element 2. The blades 5 and 6 are so shaped that with the upper supporting portion 2 they form a member which is rectangular in outline. As shown in Figures 1 and 2, the height from the top 2 to the blade 14 is about the same as that from the top 2 to the blade 7, but the width of the cultivator in the rear portion between the blades 5 and 6 is substantially greater than the width of the forward portion between the blades 3 and 4. Thus, when the tool is drawn or pushed through the soil an excellent fining action is secured by the blades 3, 4, 5, 6, and 15, each of which is disposed in a substantially vertical plane and each being spaced laterally from the other. If desired more than one auxiliary fining blade 15 may be provided in either the back or front portion of the cultivator. This will depend of course upon the size of the tool, whether it be operated by hand, the types of soil in which it will be used, and other variable factors.

The blade 14 is generally arcuate in cross-section as indicated in Figure 2, and is provided with integral teeth 17 and 18. Two teeth have been shown but a greater or lesser number may be employed as previously explained in connection with the blade 7.

The leading edge 19 of the blade 14 and the edges 20 and 21 of the teeth 17 and 18 may be sharpened as indicated in Figure 2. The trailing edge 22 of the blade 14 which constitutes the leading edge of the blade when the cultivator is pushed, may likewise be sharpened and if desired, the edges 23, 24, 25, and 26 of the blades and upper supporting element 2 may also be sharpened in the event the cultivator is to be used for soil fining by an up and down chopping motion which will be described.

It will be observed that the front blade 7 is spaced from the rear blade 14 a substantial distance and the opening between the two blades is unobstructed. This permits the blade 7 to penetrate easily below the upper surface of the soil and is also important in depth control, as will be more fully brought out.

In order to provide for manual operation of the device, a handle socket 27 is provided, but a handle has not been shown in Figure 1.

Reenforcing ribs and gussets may be provided wherever necessary to strengthen the cultivator, but the size, shape, and location of such elements will depend upon the size and type of cultivator and its intended use.

The manner in which depth control is effected will now be described. When the cultivator is pulled through the earth by its handle, the teeth 9 and 10 first engage the surface of the soil and, being inclined downwardly, impart a downward thrust component which causes a digging action to take place. This brings the blade 7 into engagement with the soil and, since it too is inclined downwardly, it exerts a similar thrust. Downward motion below the soil surface continues and is unobstructed until the blade 14 and its teeth 17 and 18 engage the soil surface. This engagement is determined to a great extent by the angle at which the handle is held as the forward motion is effected. The blade 14 being spaced to the rear of the blade 7 permits it to enter the earth freely and since the blade 7 is relatively sharp this is readily effected even though hard crusts be encountered. Once the blade 7 has been inserted through the upper crust, it thereafter moves below the surface of the soil. The blade 14 is preferably arcuate and, therefore, has an average slope which is approximately zero. When the blade 14 comes into contact with the earth it serves to retard or control the downward thrust or digging action of the forward blade 7. The teeth 17 and 18 may be curved or inclined but preferably are straight and disposed at the same angle as the blade 7 and the teeth 9 and 10. The teeth in the embodiment illustrated constitute a minor portion of the surface area of the blade 14 and, therefore, may be disposed at any desired angle for best fining results. Good results are obtained with the teeth disposed as shown in Figure 2.

The relationship between the front digging blade and rear depth control blade must be such that the digging blade will have a downward angle of inclination, in the direction of movement when measured from a line drawn parallel with the horizontally disposed top 2 of the cultivator, greater than that of the control blade, which may be inclined downwardly from such line a lesser degree than the digging blade or may be inclined upwardly therefrom. By the recitation in the claims that the digging blade has a greater downward inclination in the direction of movement than that of the depth control blade, I intend to include any of the conditions just expressed. I have obtained exceptionally good results with the blade 7 at an angle of inclination between 15 and 25 degrees as mentioned previously and the control blade 14 substantially horizontal. The control blade 14 may have a downward inclination from 0 to about 10 degrees, or may, in fact, be upwardly inclined from 0 to about 10 degrees. I do not wish to be restricted to any degree of angularity.

The retardation by the blade 14 of the downward thrust or digging action of the blade 7 is not great when working in light, open surface soil, free of crust, but as the cultivator gets below the surface and into contact with firmer soil the control is obviously more effective. The control of the depth of cut of the cultivator may be kept substantially uniform by simply maintaining the handle at a substantially uniform angle and applying a generally constant pressure.

The cultivator may be operated by continuously pulling it through the soil, or by a stroking action as with a garden hoe, except that a much larger sweep may be effected on each stroke because in this position the cultivator does very little, if any, soil transferrence.

From this description it will be clear that the cultivator may be pulled by a horse or tractor with equally good results. It also may be attached to a high or low wheeled hand garden cultivator which is pushed. In all such instances, of course, the direction of movement of the cultivator will be in the direction of the teeth or inclination of the blade 7.

In the cultivator shown in the drawing, provision is made to effect cultivation, that is weed removal, soil fining, etc., upon either a pushing or pulling motion so that the device may be utilized in much the same manner as a scuffle hoe. A reciprocatory pushing and pulling motion is easy and convenient, requires no lifting of the tool, and with my cultivator produces not only weed severance, but soil fining is accomplished as well. This is effected in the following manner.

When the cultivator is pushed, the downward slope of what is now the leading edge 22 of the rear blade 14 digs down to a certain extent while the upward slope of the oppositely curved portion of the blade and the inclined teeth 17 and 18 tend to retard the downward thrust and provide some measure of depth control. This is augmented by the upward inclination, in the direction of travel of the tool when pushed, of the blade 7 and its teeth 9 and 10. Thus, depth control is obtained in much the same manner as when the cultivator is pulled. It should be noted that when the cultivator is pushed and the blade 14 is the digging blade, the control blade 7 is not at a substantially zero angle, but is actually upwardly inclined in the direction of movement. In other words, the angle of downward inclination of the digging blade is greater than the controlling blade.

The teeth 9, 10, 17, and 18 as well as the vertically disposed blades 3, 4, 5, 6, and 15 serve as soil finers. Their fining effect is enhanced if the cultivator is given a slight lateral movement as it is oscillated, for the flat surfaces of the blades which are vertically disposed will thereby be brought into play.

I wish to make clear that the average downward slope of the blade 14 in the direction of movement when being pushed may be substantially less than the downward slope of the blade 7 when pulled for when the cultivator is pushed, the handle being disposed a substantial distance above the blade 14 creates a downward force component tending to cause the teeth to dig in; whereas, when the cultivator is pulled there is an upward component and this tends to compensate for the downward thrust of the blade 7 and the teeth 9 and 10. By reducing the inclination of the blade 14, or by making it slightly curved as shown, a substantially universal depth control is possible without difficulty whether the cultivator be pushed or pulled or oscillated. Very little experience in the operation of the cultivator will be necessary, for by proper correlation of the position of the handle with respect to the depth of cut desired, the operator may obtain a uniform depth of cultivation in either a pulling or pushing motion or both.

The depth of cut can be varied at will by changing the tilt of the cultivator by raising or lowering the operator's end of the handle. Generally, when the cultivator is pushed a somewhat higher handle position is required than in pulling, for the same depth of cut. This, however, will be almost automatically compensated for by the operator, because the tendency in pulling the cultivator will be to bear down; whereas, in pushing the cultivator the tendency will be to elevate the handle. The depth of cut is obviously also controlled by the pressure exerted by the operator, but ordinarily very little pressure is needed to secure a substantial cut. In fact, in open soils so little pressure is needed that a sufficient depth of cut can be obtained by operating the cultivator with one hand, holding the end of the handle. By gradually increasing the downward pressure with each successive pull and push of the device and by regulating the tilt of the handle, the soil can be fined satisfactorily to a depth necessary for deep plantings. The device may also be used for the original preparation and fining of soil where a plow or harrow or both are not available.

Where the cultivator is drawn or pushed forward, depth control may be effected by adjusting the position of the tang by which the cultivator is attached to the source of locomotion. In such event, the cultivator will not be given a reciprocatory pushing and pulling motion and the downward curving of the blade 14 to the edge 22 is not necessary or is it necessary to curve the blade 14 at all—it may be inclined to a lesser angle than the blade 7, may be horizontally disposed or may be slightly upwardly inclined from the horizontal and in the direction of travel.

Another optional feature which may be provided in the cultivator where it is desired to use it to fine surface clods, is to provide the sharpened edges 23, 24, 25, and 26 which may be brought down upon the clods in an up and down chopping motion. Also, for removing weeds very close to plants, the cultivator in such a vertical position may be placed around the plant with the plant extending through one of the appropriate openings between the blades 5 and 15 or 6 and 15 and a downward and sidewise movement imparted thereto, effective for cutting off the weed without injuring the plant. Where soil is to be transferred as in hilling, the device may be inverted from its usual cultivation position as shown in Figure 1, and the broad, flat top 2 may be used as a conventional hoe to pull the soil into the desired position.

While I have illustrated and described a preferred embodiment of my invention, it will be understood that the same is not limited thereto, but may be otherwise embodied and practiced within the scope of the following claims.

I claim:

1. In a cultivator which is effective for soil cultivation when pushed or pulled, a pair of substantially horizontally disposed soil working blades, one disposed in spaced relationship to the rear of the other, a leading cutting edge on each of said blades, a downwardly inclined surface of each of said blades terminating in the leading cutting edge of each, said inclined surfaces being opposed with one being inclined forwardly and the other inclined rearwardly of the cultivator, whereby when said cultivator is either pushed or pulled, the leading edge of one blade will effect a digging action and the spaced opposed surface of the other blade will retard and control the digging action.

2. In a cultivator, an open framed member having a substantially horizontally extending, digging blade inclined forwardly and downwardly in the direction of travel thereof, a second open framed member disposed in spaced relationship with respect to the first member to the rear thereof along said direction of travel, and a substantially horizontally extending soil working and controlling blade forming part of said second member, said soil working and controlling blade having a forwardly and downwardly inclined portion and a rearward and downwardly inclined portion in said direction of travel, whereby when said cultivator is either pushed or pulled, the leading edge of one blade will effect a digging action and the spaced oppositely inclined surface of the other blade will retard and control the digging action.

3. In a cultivator, a top member, a plurality of substantially horizontally disposed soil working blades attached to said top in spaced relationship to each other along one direction of motion of said blades in cultivation, one of said blades having a forwardly and downwardly inclined surface in said direction of motion to impart a digging tendency to said blade, the second of said blades disposed to the rear of the first blade having a forwardly and downwardly inclined surface in said direction of motion lesser than the downward angle of inclination of the first blade to control the depth of cut by the first blade by impeding downward movement thereof, said second blade also having a rearwardly and downwardly inclined surface in said direction of motion to impart a digging tendency to said second blade when said cultivator is moved in a direction opposed to said direction of motion, said inclined surface of the first blade controlling the depth of cut by the second blade by impeding downward movement of the second blade during such opposed motion of the cultivator.

4. In a cultivator, two substantially horizontally disposed soil working blades, one of said blades being inclined forwardly and downwardly along one direction of travel of said cultivator and the other of said blades being arcuate in a downward direction and having a forwardly inclined and a rearwardly inclined surface for soil engagement, means connecting said blades in spaced relationship along said direction of travel, whereby the cultivator may be operated along said direction of travel or opposed thereto with depth control of the leading blade effected by an inclined surface of the trailing blade.

5. In a cultivator, a substantially flat, plane top, a front pair of vertically disposed cutting blades depending from the top, a substantially horizontally disposed cutting blade joining the lower extremities of the vertical blades, a forwardly and downwardly inclined surface on the horizontal blade terminating in a sharp cutting edge, teeth on said blade extending in generally the same plane as the plane of said inclined surface, a rear pair of vertically disposed cutting blades depending from the top and spaced both laterally and longitudinally from the front pair of blades, a substantially horizontally disposed cutting blade joining the lower extremities of the rear pair of blades, said last named horizontally disposed blade being curved in both directions and terminating in leading cutting edges having trailing inclined surfaces, teeth on said arcuate blade extending generally in the same direction as those on the front horizontal blade, sharpened cutting edges on each of said vertically disposed blades extending a substantial distance above said horizontally disposed blades, whereby the cultivator may be pushed or pulled and soil fining will result from severance of the soil by the leading cutting edge of the leading horizontal cutting blade and the sharpened edges of the spaced vertical blades and rupture thereof by the trailing horizontal blade and visible certainty of the position of the cutting parts relative to the plants will be available through the vertically disposed members.

LEVI B. MILLER.

REFERENCES CITED

The following references are of record in the file of this patent:

UNITED STATES PATENTS

| Number | Name | Date |
|---|---|---|
| 397,735 | Mansfield | Feb. 12, 1889 |
| 1,239,316 | Svendsen | Sept. 4, 1917 |
| 1,331,734 | Wilson | Feb. 24, 1920 |
| 1,594,984 | Stafford | Aug. 3, 1926 |
| 1,722,293 | Hoffman | July 30, 1929 |
| 2,037,480 | Nedbal | Apr. 14, 1936 |

FOREIGN PATENTS

| Number | Country | Date |
|---|---|---|
| 11,556 | Great Britain | May 19, 1904 |
| 269,269 | Germany | Jan. 16, 1914 |